United States Patent [19]

Sugiyama

[11] Patent Number: 5,355,168
[45] Date of Patent: Oct. 11, 1994

[54] HIGH PRECISION MOTION COMPENSATION APPARATUS

[75] Inventor: Kenji Sugiyama, Yokosuka, Japan

[73] Assignee: Victor Company of Japan, Ltd., Yokohama, Japan

[21] Appl. No.: 968,124

[22] Filed: Oct. 29, 1992

[30] Foreign Application Priority Data

Oct. 30, 1991 [JP] Japan ................... 3-313607

[51] Int. Cl.$^5$ ........................................ H04N 7/137
[52] U.S. Cl. ................... 348/416; 348/407; 348/409; 348/411; 348/412; 348/402
[58] Field of Search ............. 358/136, 138, 140, 135, 358/133; 348/402, 407, 413, 384, 390, 399; H04N 7/137, 7/133

[56] References Cited

U.S. PATENT DOCUMENTS

| | | |
|---|---|---|
| 4,838,685 | 6/1989 | Martinez et al. |
| 5,148,269 | 9/1992 | de Haan et al. ............ 358/140 |
| 5,157,742 | 10/1992 | Niihara ..................... 358/136 |
| 5,170,259 | 12/1992 | Niihara ..................... 358/135 |
| 5,212,548 | 5/1993 | de Haan et al. ............ 358/140 |

FOREIGN PATENT DOCUMENTS

| | | |
|---|---|---|
| 0294962 | 12/1988 | European Pat. Off. |
| 0447068 | 9/1991 | European Pat. Off. |
| 2214283 | 8/1990 | Japan . |
| 3217184 | 9/1991 | Japan . |
| 3217185 | 9/1991 | Japan . |
| 4189093 | 7/1992 | Japan . |
| 2202706 | 9/1988 | United Kingdom . |
| 2236449 | 4/1991 | United Kingdom . |

OTHER PUBLICATIONS

Fourth International Colloquium on Advanced Television Systems—Ottawa, CA—Jun. 25-29, 1990, pp. 3B.3.1–3B.3.19, DuBois et al. 'Review of Techniques for Motion Estimation and Motion Compensation'.
International Broadcasting Convention—Brighton, UK—Sep. 23-27, 1988, pp. 256-259, Thomas 'Distorting the Time Axis: Motion-Compensated Image Processing in the Studio'.

*Primary Examiner*—Tommy P. Chin
*Assistant Examiner*—Vu Le
*Attorney, Agent, or Firm*—Lowe, Price, LeBlanc & Becker

[57] ABSTRACT

A motion compensation apparatus for receiving information on motion vectors and for performing a motion compensation of dynamic image signals with a precision equal to or finer than one pixel. The information on motion vectors has been estimated from a reference field or frame represented by a reference field signal or a reference frame signal and from other fields or other frames represented by other field signals or frame signals. The motion compensation apparatus is provided with a coefficient determination device for determining resampling coefficients corresponding to signals which are generated by combining the other field (or frame) signals according to mutual relations among values equal to or less than a pixel distance, which values are respectively indicated by the motion vectors, and image shifting devices for resampling and adding up the field (or frame) signals by using the sampling coefficients to obtain image signals representing shifted pixels, which are motion-compensated with the precision that is equal to or finer than one pixel.

13 Claims, 4 Drawing Sheets

| MV A | MV B | A1 | A2 | A3 | A4 (×1/32) | B1 | B2 | B3 | B4 |
|---|---|---|---|---|---|---|---|---|---|
| 0    | 0    |  0 | 16 |  0 |  0 |  0 | 16 |  0 |  0 |
| 0    | 0.25 | -3 | 22 | -3 |  0 |  0 | 18 | -2 |  0 |
| 0    | 0.5  | -3 | 22 | -3 |  0 |  0 |  8 |  8 |  0 |
| 0    | 0.75 | -3 | 22 | -3 |  0 |  0 | -2 | 18 |  0 |
| 0.25 | 0    |  0 | 18 | -2 |  0 | -3 | 22 | -3 |  0 |
| 0.25 | 0.25 | -2 | 15 |  4 | -1 | -2 | 15 |  4 | -1 |
| 0.25 | 0.5  | -3 | 19 |  0 |  0 |  0 |  8 |  8 |  0 |
| 0.25 | 0.75 |  1 | 20 | -4 | -1 | -1 | -4 | 20 |  1 |
| 0.5  | 0    |  0 |  8 |  8 |  0 | -3 | 22 | -3 |  0 |
| 0.5  | 0.25 |  0 |  8 |  8 |  0 | -3 | 19 |  0 |  0 |
| 0.5  | 0.5  | -2 | 10 | 10 | -2 | -2 | 10 | 10 | -2 |
| 0.5  | 0.75 |  0 |  8 |  8 |  0 |  0 |  0 | 19 | -3 |
| 0.75 | 0    |  0 | -2 | 18 |  0 | -3 | 22 | -3 |  0 |
| 0.75 | 0.25 | -1 | -4 | 20 |  1 |  1 | 20 | -4 | -1 |
| 0.75 | 0.5  |  0 |  0 | 19 | -3 |  0 |  8 |  8 |  0 |
| 0.75 | 0.75 | -1 |  4 | 15 | -2 | -1 |  4 | 15 | -2 |

HIGH PRECISION MOTION COMPENSATION APPARATUS

BACKGROUND OF THE INVENTION

1. Field of the Invention

This invention generally relates to an apparatus for performing a highly efficient coding or an image standards conversion, which is for use in a system for recording, transmitting and displaying digital image signals. More particularly, this invention relates to a motion compensation apparatus for performing a motion compensation processing (or movement compensation processing) on dynamic image signals with a high precision to one pixel or pel, namely, to the interval or distance (hereunder sometimes referred to simply as a pixel interval or distance) between two adjoining pixels.

2. Description of the Related Art

A typical method for performing a highly efficient coding of dynamic image signals is an interframe prediction coding method, by which a frame to be coded is predicted from a previous frame already coded and only a coding of prediction error is performed. In case of employing such an interframe prediction coding method, what is called a motion-compensated interframe prediction for effecting the prediction by changing an image in accordance with the motion of a moving object has come to be generally performed.

Further, it has become known that when an interpolation of scanning lines or frames is performed, deterioration of resolution or the like can be made to be small in case where a motion compensation is effected in an image standards converter for converting interlace signals into non-interlace signals or converting an image signal of a certain frame frequency into another image signal of a different frame frequency.

In case where the accuracy of a motion vector is equal to or coarser than the pixel interval, such a motion compensation operation is merely to shift the position of a pixel. However, in case of performing a motion compensation with high accuracy finer than the pixel interval, a motion compensation signal is generated by effecting a resampling processing.

Further, such a processing can be more appropriately done by performing a prediction and an interpolation by using a plurality of frames.

Hereinafter, a conventional motion compensation apparatus will be described.

Referring to FIG. 4, there is shown the configuration of an example of a conventional motion compensation apparatus which performs a motion compensation on a reference image to be processed, namely, a reference field with high precision from two fields (hereunder sometimes referred to as precedent and subsequent fields) respectively precedent and subsequent to the reference field.

A precedent field signal representing a precedent field is inputted from a precedent-field-signal input terminal 3 to both of a motion vector (MV) estimating device 5 and a pixel shift device 7, and on the other hand a subsequent field signal representing a subsequent field is inputted from a subsequent-field-signal input terminal 4 to both of another MV estimating device 6 and a pixel shift device 8. Moreover, a reference field signal representing the reference field is inputted from a reference-image input terminal 2 to both of the MV estimating devices 5 and 6.

In the MV estimating device 5, motion vectors representing the displacement of a moving object, which is shown in a dynamic image (namely, the reference image), between the precedent and reference fields are estimated from the precedent field signal and the reference field signal. Similarly, in the MV estimating device 6, motion vectors representing the displacement of the moving object between the reference and subsequent fields are estimated from the reference field signal and the subsequent field signal. Such motion vectors are estimated by performing a pattern matching process (namely, what is called a block matching process) on each block, which consists of 16×16 pixels, of the reference field, namely, by evaluating predetermined measure of the prediction error corresponding to a block of the reference field and blocks of the precedent or subsequent field, which are indicated by what is called trial motion vectors, and then determining one of the trial motion vectors corresponding to a minimum prediction error as the motion vector corresponding to the block of the reference field and effecting such a process on each of the other blocks of the reference field.

Thereafter, signals representing the motion vectors estimated by the MV estimating device 5 (hereunder sometimes referred to as the precedent motion vectors) are outputted therefrom through a precedent MV output terminal 11 to another circuit and moreover are supplied to the pixel shift device 7 and a micro-shift device 17. Similarly, signals representing the motion vectors estimated by the MV estimating device 6 (hereunder sometimes referred to as the subsequent motion vectors) are outputted therefrom through a subsequent MV output terminal 12 to another circuit and moreover are supplied to the pixel shift device 8 and a micro-shift device 18.

Incidentally, in a coding system, it is necessary for performing a decoding processing later to output the motion vectors. However, in case of an image conversion system, it is not necessary for the motion compensation apparatus to output the motion vectors because the image conversion system has only to obtain motion-compensated image signals. In contrast, a decoding system does not estimate motion vectors but receives motion vectors from a coding system.

In the pixel shift device 7, a pixel represented by the precedent field signal is shifted on the basis of the precedent motion vector with precision that is equal to the pixel interval. Then, a signal representing the shifted pixel is fed to the micro-shift device 17. Subsequently, to perform a resampling processing, the micro-shift device 17 multiplies data representing each of such pixels by a coefficient corresponding to a motion represented with accuracy to further the pixel interval and further adds results of such multiplications up. Namely, among values equal to or less than a pixel distance, which values are respectively indicated by information on the motion vectors, part of such information represented with precision, which is equal to or finer than the pixel interval, is used by the pixel shift device 7. Further, the remaining part of such information represented with precision, which is finer than the pixel interval, is used by the micro-shift device 17. The thus motion-compensated precedent-field signal is supplied to an adder 14.

Similarly, in the pixel shift device 8, a pixel represented by the subsequent field signal is shifted on the basis of the subsequent motion vector with precision that is equal to the pixel interval. Subsequently, the micro-shift device 18 multiplies data representing each of the shifted pixels is multiplied by a coefficient corresponding to a motion represented with accuracy to the pixel interval and further adds results of such multiplications up. Further, the micro-shift device 18 supplies signals representing results of such operations as the thus motion-compensated subsequent-field signal to the adder 14. Then, the adder 14 adds both of data respectively represented by the thus motion-compensated precedent-field and subsequent-field signals and outputs a signal representing a result of this addition as a motion-compensated signal through a motion-compensated-signal output terminal 15 to another circuit.

Here, note that in the foregoing description, the processing has been described as performed on each field of an interlace signal, but can be performed on each frame thereof similarly.

Further, in such an interlace signal generally used in television broadcasting, each field signal is obtained by "thinning out" a frame signal and therefore contains many aliasing frequency-components (hereunder sometimes referred to as aliasing components). Moreover, even in case of a non-interlace signal, each field signal includes aliasing components if the diameter of an electron beam of a television camera is smaller than the interval between adjoining scanning lines.

When a high-precision motion compensation is performed on such a field signal in the conventional motion compensation apparatus, an image generated by performing a resampling processing is not correct due to the aliasing components thereof. Thus the conventional motion compensation apparatus has a defect in that appropriate prediction and interpolation cannot be achieved.

The present invention is accomplished to eliminate such a defect of the conventional motion compensation apparatus.

It is, accordingly, an object of the present invention to provide a motion compensation apparatus which can obtain more suitably motion-compensated signals as a result of generating image signals, the density of which is higher that of field signals, by adding up the field signals when high-precision motion-compensated signals are obtained from a plurality of fields, and then performing a resampling processing on the image signals by using resampling coefficients corresponding thereto.

SUMMARY OF THE INVENTION

To achieve the foregoing object, in accordance with the present invention, there is provided a motion compensation apparatus (incidentally, a corresponding practical example thereof is illustrated in FIG. 1) for receiving information on motion vectors and for performing a motion compensation of dynamic image signals with precision that is equal to or finer than a distance between adjoining pixels (incidentally, the information on motion vectors has been estimated from a reference field (or frame) represented by a reference field signal (or a reference frame signal) and other fields (or other frames) represented by other field signals (or frame signals)), which comprises coefficient determination means (corresponding to a coefficient determination device 13 of FIG. 1) for determining resampling coefficient corresponding to signals which are generated by adding the field (or frame) signals according to mutual relations among values equal to or less than a pixel distance, which values are respectively indicated by the motion vectors and image shifting means (corresponding to re-samplers 9 and 10 of FIG. 1) for resampling and adding up the other field (or frame) signals by using the resampling coefficients to obtain image signals representing shifted pixels, which are motion-compensated with precision that is equal to or finer than the distance between adjoining pixels.

In case of an embodiment of such a motion compensation apparatus, the coefficient determination means is composed of a plurality of coefficient determination sub-means (corresponding to coefficient determination devices of micro-shift portions 21 to 24 and 31 to 34 of FIGS. 2 and 3) for generating resampling coefficients corresponding to the motion vectors changed minutely. Further, the image shift means are comprised of a plurality of image shift sub-means (corresponding to re-samplers of the micro-shift portions 21 to 24 and 31 to 34 of FIGS. 2 and 3) for generating motion-compensated signals by using the resampling coefficients outputted from the plurality of coefficient determination sub-means. Moreover, the embodiment of the motion compensation apparatus of the present invention further comprises an optimal signal selection means (corresponding to an optimal signal determination device 25 of FIGS. 2 and 3) for selecting an optimal signal, which is most conformable with the reference signal, out of the plurality of motion-compensated signals generated by the plurality of image shift sub-means.

Furthermore, in another embodiment of the motion compensation apparatus of the present invention, the coefficient determination means is adapted to change the resampling coefficients to use more fields or frames (namely, as will be described later, in case of a practical example of FIG. 5, a response is intentionally delayed to use both fields (or frames)) even in case where only a part of the other fields or frames are used when the motion compensation is performed by using resampling coefficients corresponding to the further signals (namely, as will be described later, in case of the practical example of FIG. 5, only a coefficient A2 is 32/32 and other coefficient are 0 when a value MVA is 0 and another value MVB is 0.5).

Thus, when a motion-compensated signal is produced with high accuracy from a plurality of fields in the motion compensation apparatus, each field signal is used as sub-sampled part of image signals, the density of which is higher than that of each field signal, instead of effecting a filtering, namely, a resampling of each field. Further, in case of the motion compensation apparatus, a resampling is performed on high-density image signals generated by adding field signals. Namely, once, high-density image signals are virtually produced. Then, the pixels represented by the generated image signals are shifted by the resampling. Thereafter, the image signals obtained as the result of shifting the pixels are thinned out. Practically, the same effects of such an operation can be achieved by employing high-density resampling coefficients.

At that time, in comparison with each field signal, which is obtained by effecting a thinning of a frame signal and contains aliasing components, in case of the high-density image signals, aliasing components are suppressed. Thus, in case of each field signal obtained as a result of resampling from such a high-density image signal and thinning out of the re-sampled signal, aliasing components are properly reduced or suppressed. Consequently, a motion-compensated signal, in which aliasing components are properly suppressed, can be obtained. Further, resampling-and-filtering frequency characteristics are improved. Consequently, the frequency characteristics of the thus obtained motion compensation signal can be improved.

Moreover, when the thus obtained motion-compensated signals are used in an interframe (or interfield) predictive coding, prediction error decreases with the result that data quantity can be further reduced. Furthermore, when such motion-compensated signals are used in a scanning-line interpolation or a field interpolation, a natural and high-resolution image can be obtained.

As above described, the motion compensation apparatus can obtain practically distinguished effects or advantages.

BRIEF DESCRIPTION OF THE DRAWINGS

Other features, objects and advantages of the present invention will become apparent from the following description of preferred practical examples or embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

1. First Embodiment

Figure 1:
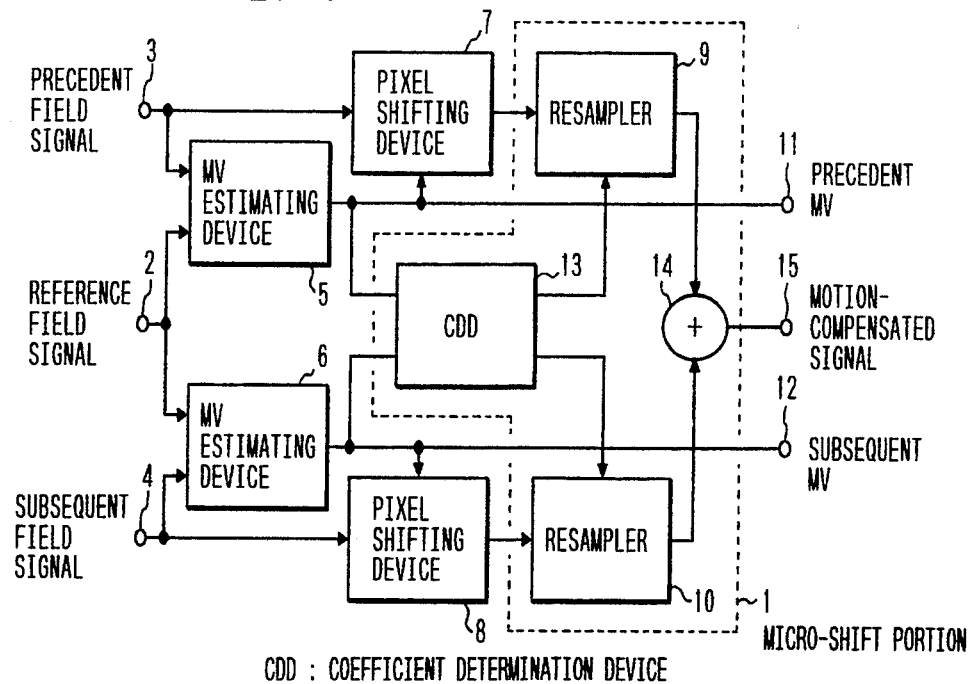
FIG. 1 is a schematic block diagram for illustrating the configuration of a motion compensation apparatus embodying the present invention (namely, a first embodiment of the present invention)

FIG. 1 is a schematic block diagram for illustrating the configuration of a motion compensation apparatus embodying the present invention (namely, a first embodiment of the present invention). This embodiment is different in an employed method for generating filtering coefficients, by which data on pixels are multiplied to perform a motion compensation with precision that is equal to or finer than a pixel distance (namely, the distance between adjoining pixels), from the conventional motion compensation apparatus. Incidentally, the first embodiment is not different in a method for estimating motion vectors and in a manner of shifting the pixels with accuracy, which is equal to the pixel distance, from the conventional motion compensation apparatus.

Precedent field signals inputted from a precedent field input terminal 3 are further inputted to a precedent MV estimating device 5 and a pixel shifting device 7. On the other hand, subsequent field signals inputted from a subsequent field input terminal 4 are further inputted to a precedent MV estimating device 6 and a pixel shifting device 8. Moreover, reference field signals inputted from a reference image input terminal 2 are further inputted to both of the MV estimating devices 5 and 6.

In the MV estimating device 5, a precedent motion vector corresponding to the motion of an object between the reference field and a precedent field is obtained from the precedent signal and a reference field signal. Similarly, in the MV estimating device 6, a subsequent motion vector corresponding to the motion of the object between the reference field and a subsequent field is obtained from the reference signal and a reference field signal.

A signal representing the precedent motion vector obtained by and outputted from the MV estimating device 5 is outputted from the motion compensation apparatus through a precedent MV output terminal 11 to another circuit and is further applied to a pixel shifting device 7 and a coefficient determination device 13 of a micro-shift portion 1. Similarly, a signal representing the subsequent motion vector obtained by and outputted from the MV estimating device 6 is outputted from the motion compensation apparatus through a subsequent MV output terminal 12 to another circuit and is further applied to a pixel shifting device 8 and the coefficient determination device 13.

Next, in the pixel shifting device 7, pixels represented by the precedent field signals are shifted with the accuracy, which is equal to one pixel, according to the precedent motion vector. Further, a signal representing a result of the shifting of the pixels is supplied to a re-sampler 9 of the micro-shift portion 1. Similarly, in the pixel shifting device 8, pixels represented by the subsequent field signals are shifted with the accuracy, which is equal to one pixel, according to the subsequent motion vector. Further, a signal representing a result of this shifting of the pixels is supplied to a re-sampler 10.

Then, in the coefficient determination device 13, resampling-and-filtering coefficients are determined by looking up a coefficient table according to the values equal to or less than a pixel distance, which are respectively indicated by both of the motion vectors. A signal representing the determined resampling-and-filtering coefficient is outputted therefrom to the re-samplers 9 and 10. Incidentally, the contents of the coefficient table are preliminarily written to a read-only memory (ROM) and are read therefrom by using a value indicated by the motion vector as an address thereof.

Subsequently, the re-sampler 9 of the micro-shift portion 1 performs a motion compensation on the precedent field signal, each corresponding pixel of which has already undergone the shifting, with the accuracy equal to or less than one pixel by using the coefficients indicated by the received signal. The thus processed signal is fed to an adder 14 of the micro-shift portion. Similarly, the re-sampler 10 of the micro-shift portion 1 effects a motion compensation on the subsequent field signal, each corresponding pixel of which has already undergone the shifting, with the accuracy equal to or less than one pixel by using the coefficients indicated by the received signal. The signal thus processed in the re-sampler 10 is supplied to the adder 14. Thereafter, the adder 14 adds values respectively represented by the signals received from the samplers 9 and 10 and outputs a signal indicating a result of this addition as a motion-compensated signal through a motion-compensated signal output terminal 15.

Figures 5A, 5B:
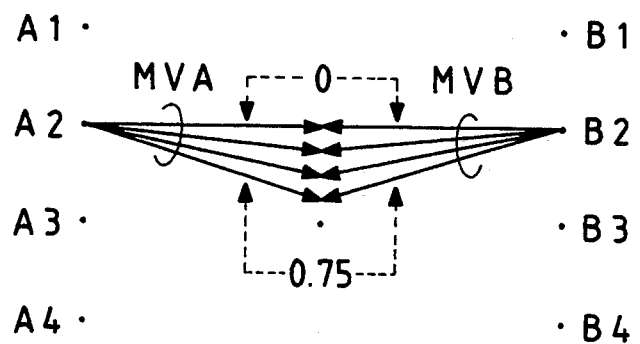
FIG. 5(A) is a diagram for illustrating an example of resampling filtering coefficients corresponding to a motion vector.
FIG. 5(B) is a diagram for illustrating the relation between a motion vector and each of the positions of pixels.

Next, an operation of the coefficient determination device 13 will be described hereinbelow. The resampling-and-filtering coefficient cannot be determined according to the motion vectors supplied only from one of the MV estimating devices 5 and 8. Namely, the combination of the motion vectors respectively supplied from the MV estimating devices 5 and 6 is necessary for determining the coefficients. Examples of such coefficients are shown in FIG. 5(A). Further, a portion of a resampling-and-filtering response in case of an example of the combination of the coefficients respectively corresponding to the precedent motion vector and the subsequent motion vector is shown in FIG. 6(B). Incidentally, a portion of a resampling-and-filtering response of a conventional motion compensation apparatus is shown in FIG. 6(A) to be compared with the response of FIG. 6(B).

In FIG. 5(A), sub-columns A and B of a column indicate the values equal to or less than the pixel distance respectively represented by the precedent motion vector and the subsequent motion vector with the precision equal to ($\frac{1}{4}$) pixel (namely, one-fourth pixel distance). Incidentally, hereunder, the values indicated by the sub-columns A and B will be referred to as values MVA and MVB, respectively. There are four kinds of values used as each of the values MVA and MVB. Thus, there are 16 kinds of combinations of the value MVA and the value MVB. Reference characters A1 to A4 denote the values of the coefficients corresponding to the precedent field signal, and on the other hand, reference characters B1 to B4 denote the values of the coefficients corresponding to the subsequent field signal. Additionally, FIG. 5(B) shows the relation between a motion vector and each of the positions of pixels.

Figure 6A:
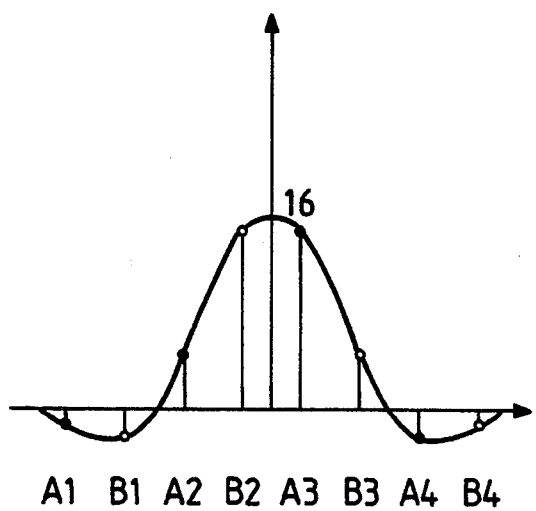
FIG. 6(A) is a diagram for illustrating a filtering response of the conventional motion compensation apparatus.
Figure 6B:
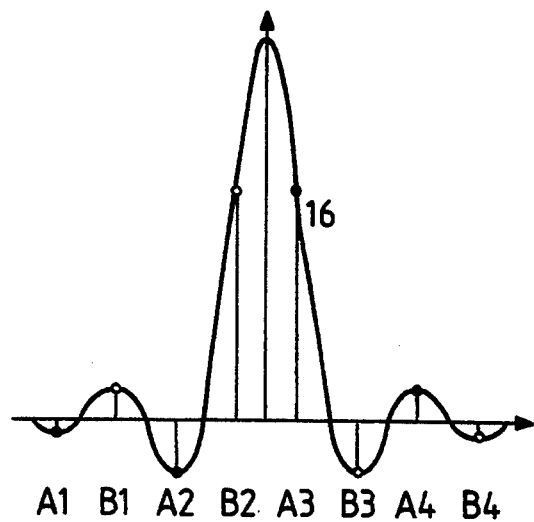
FIG. 6(B) is a diagram for illustrating a filtering response of a motion compensation apparatus of the present invention corresponding to an example of resampling filtering coefficients of FIG. 5(A).

FIGS. 6(A) and 6(B) illustrate an example of a resampling-and-filtering response of the conventional motion compensation apparatus and an example of a resampling-and-filtering response of this embodiment of the present invention in case where the values MVA and MVB are 0.75 and 0.25, respectively. In case of the conventional motion compensation apparatus, the resampling is performed on each field. Correspondingly to this, the resampling-and-filtering response in case of the conventional motion apparatus has a gently sloping form. In contrast, in case of this embodiment of the present invention, the resampling is effected by using pixels of both of the two fields. Thus the resampling-and-filtering response in case of this embodiment has a sharp form correspondingly to sampling points, the density of which is higher than that of sampling points of the conventional motion compensation apparatus. This utilizes the fact that the position of a pixel of a moving object in one of the two fields is different from that of a corresponding pixel of the moving object in the other field. If the position of a pixel of one of the two fields is in agreement with that of a corresponding pixel of the other field, the same response is obtained. However, if the center of one of the two fields is shifted to, for example, the very center of the other field, the density of the sampling points of this embodiment of the present invention becomes twice that of the sampling points in case of using the conventional motion compensation apparatus.

Thereby, the frequency characteristics of a motion-compensated signal are improved and the output level thereof becomes twice that of a motion-compensated signal generated by the conventional motion compensation apparatus at the maximum. Further, aliasing components included in each field signal are reduced. Thus even when performing a resampling, a suitable motion-compensated signal can be obtained. Consequently, a field signal obtained by thinning out of such a motion-compensated signal contains only tolerable aliasing components. Therefore, a prediction or an interpolation can be appropriately performed even when such a field signal is used in the prediction or the interpolation.

However, even if the coefficients corresponding to a high-density image signals are always used, one of the two field signals is not used at all in some cases. For example, in case that the value MVA is 0 and the value MVB is equal to 0.5, theoretically only a resampling-and-filtering coefficient A2 has a non-zero value of 32(/32) and the other coefficients become 0. As the result, the subsequent field signal is not used for the resampling at all. Thus the above described merits of utilizing both of the two fields fop the resampling cannot be obtained. As a countermeasure to prevent the occurrence of such a case, the response is intentionally delayed and the coefficients are regulated, for instance, in the manner as illustrated in FIG. 5(A) (namely, the coefficients A1=−3, A2=22, A3=−3, A4=0, B1=0, B2=8, B3=8 and B4=0) such that both of the two fields are used for the resampling.

2. Second Embodiment

Figure 2:
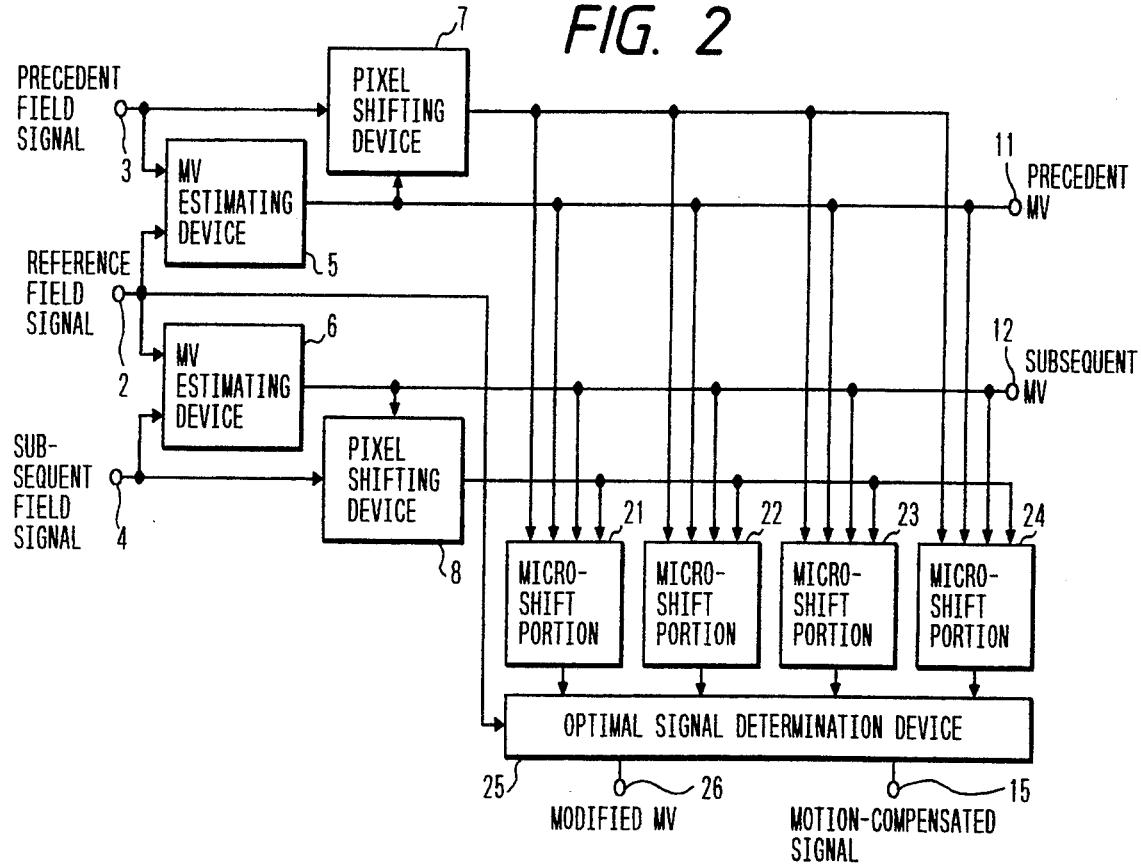
FIG. 2 is a schematic block diagram for illustrating the configuration of another motion compensation apparatus embodying the present invention (namely, a second embodiment of the present invention)

FIG. 2 is a schematic block diagram for illustrating the configuration of another motion compensation apparatus embodying the present invention (namely, a second embodiment of the present invention). The differences between the first embodiment of FIG. 1 and the second embodiment of FIG. 2 reside in that the second embodiment has a plurality of micro-shift portions, as well as an optimal signal determination device. Incidentally, each of the micro-shift portions 21 to 24 is similar to the micro-shift portion 1 consisting of the re-samplers 9 and 10, tile coefficient determination device 13 and the adder 14 as indicated by dashed lines in FIG. 1. Further, the micro-shift portions 21 to 24 are different in coefficients generated in the coefficient determination device from one another. Additionally, operations of the MN estimating devices 5 and 6 and the pixel shifting devices 7 and 8 are the same as the above described operations of the corresponding devices of the first embodiment of FIG. 1.

The reason why the plurality of micro-shift portions are provided in this embodiment is to increase the accuracy or exactitude of a motion vector estimated by the MV estimating device. Namely, in contrast with the fact that the MV estimating device performs the above described processing on each field, each of the micro-shift portions serves to make a more accurate determination by using the high-density signals. Namely, the coefficients determined by each of the micro-shift portions correspond to motion vectors which are different from one another minutely.

Signals representing a precedent field signal, a subsequent field signal, a precedent MV and a subsequent MV are inputted to the micro-shift portions 21 to 24. Incidentally, the inside structure or configuration of each of the micro-shift portions 21 to 24 is similar to that of the micro-shift portion 1 as indicated by dashed lines of FIG. 1. Further, fundamental operations of each of the micro-shift portions 21 to 24 are similar to those of the portion 1 of FIG. 1 except the coefficients outputted by the coefficient determination device of each of the portions 21 to 24. Practically, such coefficients are obtained by each of the portions 21 to 24 by being shifted minutely correspondingly to two motion vectors inputted thereto. Namely, the coefficients of groups respectively outputted by the portions 21 to 24 correspond to four kinds of combinations of the values MVA and MVB (for instance, 0 and 0; 0 and 0.25; 0.25 and 0; and 0.25 and 0.25).

Here, note that each motion vector has a vertical component and a horizontal component, that a result of the estimation, which can be sufficiently estimated in each of the fields by the MV estimating device, is used as the horizontal component and that the micro-shift portions deal with only the vertical component.

Then, an output signal of each of the micro-shift portions 21 to 24 is inputted to an optimal signal determination device 25. The optimal signal determination device 25 checks how a corresponding motion-compensated signal matches a reference field signal. Further, the optimal signal determination device 25 selects the motion-compensated signal which matches the reference field signal the best of all of those outputted from the portions 21 to 24 (namely, the device 25 selects the motion-compensated signal having a smallest error). The selected signal is outputted through the motion-compensated signal output terminal 15 as an ultimate motion-compensated signal.

Such a selection operation is similar to the MV estimation operation. However, the number of signals to be checked in the selection operation is far smaller than that of the vectors to be checked in the MV estimation operation. Therefore, the selection operation can be performed more thoroughly in comparison with the MV estimation operation. For example, in case of the MV estimation operation, an absolute value of an error (MAD) is used as a matching criterion in order to perform such an operation at a high speed. In contrast, in case of the selection operation, a means square error (MSE), which requires performing many calculations, is employed as a matching criterion, and thus a more accurate determination can be made. Incidentally, motion-vector modification information, which indicates the micro-shift portion outputting the selected signal, is outputted through a modified MV output terminal 26.

3. Third Embodiment

Figure 3:
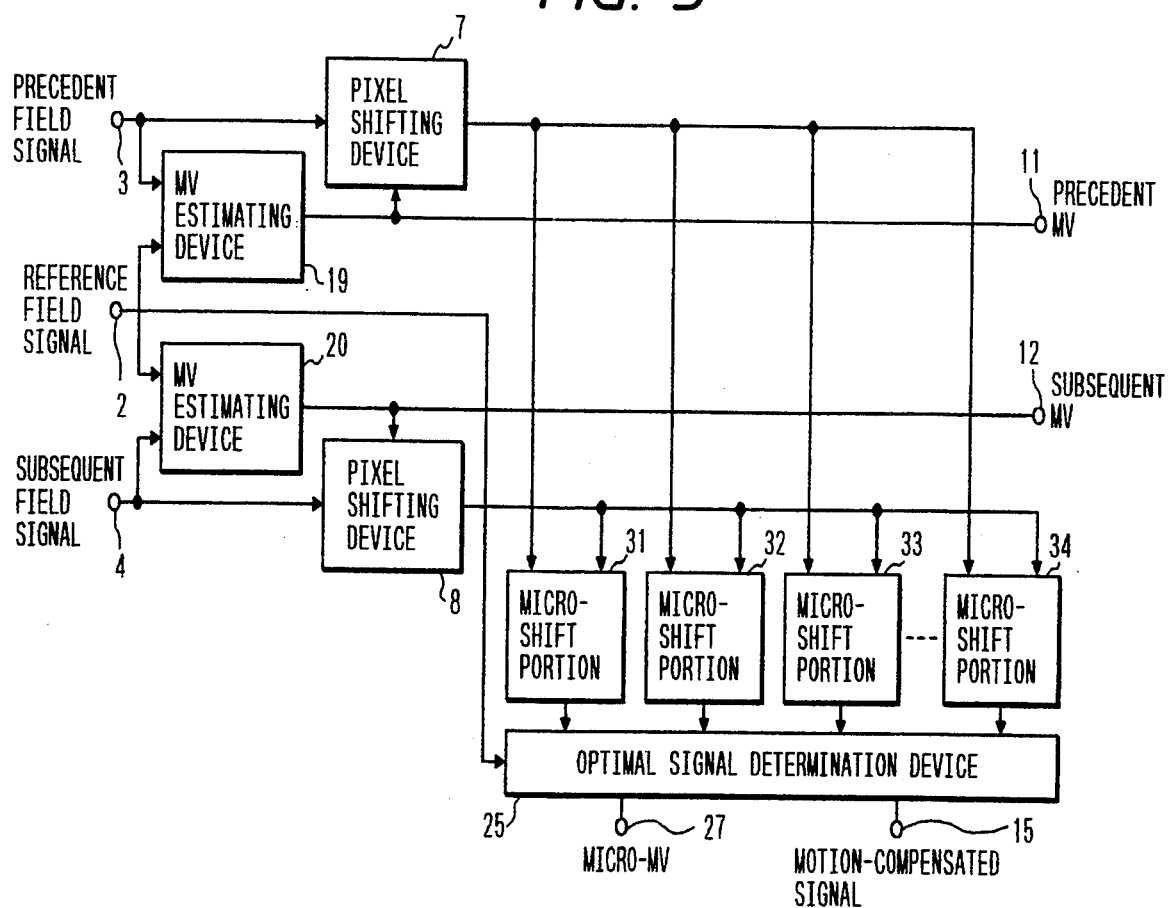
FIG. 3 is a schematic block diagram for illustrating the configuration of a further motion compensation apparatus embodying the present invention (namely, a third embodiment of the present invention)
Figure 4:
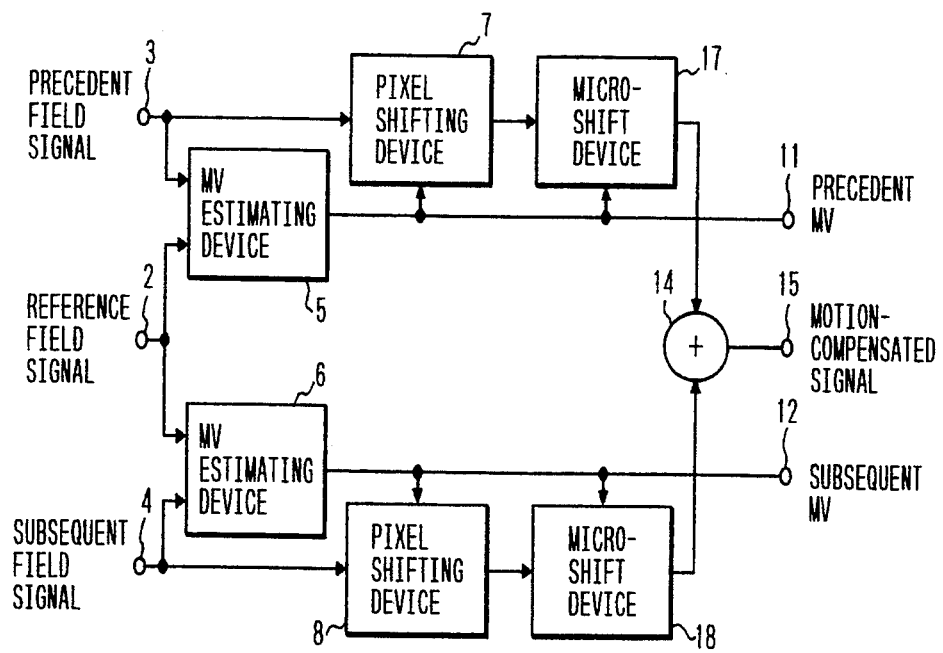
FIG. 4 is a schematic block diagram for illustrating the configuration of a conventional motion compensation apparatus embodying the present invention.

FIG. 3 is a schematic block diagram for illustrating the configuration of a further motion compensation apparatus embodying the present invention (namely, a third embodiment of the present invention). The differences between the second embodiment of FIG. 2 and the third embodiment of FIG. 3 reside in that micro-shift portions 31 to 34 of the third embodiment do not receive vector information and that the number of the micro-shift portions of the third embodiment is rather large.

In the third embodiment, the technical idea employed in the second embodiment is furthered or promoted. Namely, in each of MV estimating devices 19 and 20, the estimation of motion vectors is performed on each field with the precision to one pixel. Further, a motion compensation is performed with the precision equal to or finer than one pixel by micro-shift portions and an optimal signal determination device by using both of two fields (namely, a precedent and subsequent fields).

If an ultimate accuracy of a motion compensation is, for instance, ($\frac{1}{4}$) of a pixel, 16 micro-shift portions respectively corresponding to the coefficients of FIG. 5 are necessary. An operation of each of the re-samplers 31 to 34 is similar to that of the re-sampler of FIG. 1. However, no motion vectors are inputted to the coefficient determination device (13) of each of the micro-shift portions 31 to 34 and moreover signals representing fixed coefficients are outputted therefrom.

Additionally, information on a motion-vector having the magnitude less than one pixel, which indicates the micro-shift portion outputting a selected signal, is outputted through a micro-MV output terminal 27.

4. Fourth Embodiment (Motion Compensation Apparatus for Use in Decoder)

A motion compensation apparatus of the present invention, which is for use in a decoder of a coding system, does not effect an estimation of motion vectors but receives information on motion vectors from an encoder. Namely, the configuration of the forth embodiment is similar to that of the first embodiment of FIG. 1 except that a reference signal input terminal 2 and MV estimating devices 5 and 6 are removed therefrom. Information on both of precedent and subsequent motion vectors is inputted and is supplied directly to a coefficient determination device (13). Further, operations of pixel shifting devices 7 and 8 and a micro-shift portion 1 are similar to those of the corresponding elements of the first embodiment of FIG. 1.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A motion compensation apparatus for receiving motion vectors and for performing a motion compensation of dynamic image signals with precision that is equal to or finer than a distance between adjoining pixels, the motion vectors having been estimated by motion vector estimating device from a reference field or frame represented by a reference field signal or a reference frame signal and other fields or other frames represented by other field signals or frame signals, the motion compensation apparatus comprising:

coefficient determination means for determining resampling coefficients corresponding to further signals generated by adding the other field or frame signals according to mutual relations among values equal to or less than a pixel distance, which values are respectively indicated by the motion vectors; and image shifting means for resampling and adding up the other field or frame signals by using the resampling coefficients to obtain image signals representing shifted pixels, which are motion-compensated with said precision that is equal to or finer than the distance between adjoining pixels.

2. The motion compensation apparatus according to claim 1, which further comprises:
an optimal signal selection means for selecting an optimal signal, which is most conformable with a reference signal, out of a plurality of motion-compensated signals generated by the image shift means,
wherein the coefficient determination means comprises:
a plurality of coefficient determination sub-means for generating resampling coefficients corresponding to the motion vectors changed minutely,
wherein said image shift means comprises
a plurality of image shift sub-means for generating motion-compensated signals by using the resampling coefficients outputted from the plurality of coefficient determination sub-means.

3. The motion compensation apparatus according to claim 1, wherein the coefficient determination means is adapted to change the resampling coefficients to use more fields or frames even in case where only a part of the other fields or frames are used when said motion compensation is performed by using resampling coefficients corresponding to the further signals.

4. A motion compensation apparatus for receiving motion vectors and for performing a motion compensation of dynamic image signals with precision that is equal to or finer than a distance between adjoining pixels, the motion vectors having been estimated from a reference field or frame represented by a reference field signal or a reference frame signal and other fields or other frames represented by other field signals or frame signals, the motion compensation apparatus comprising:
a plurality of image shifting means each for generating and outputting motion-compensated signals by generating resampling coefficients correspondingly to the motion vectors change minutely, and by resampling and adding up the other field or frame signals by using the sampling coefficients with said precision that is equal to or finer than the distance between adjoining pixels; and
selection means for selecting the motion-compensated signal which matches the reference field or frame signal best of the motion-compensated signals outputted from the plurality of the image shifting means.

5. The motion compensation apparatus according to claim 4, wherein the number of said image shifting means is equal to a number obtained by multiplying the number of the motion vectors, which are set correspondingly to each field or frame and different minutely from each other, by the number of the other fields or frame signals to be added up.

6. The motion compensation apparatus according to claim 1, wherein said motion vectors include at least first and second motion vectors, estimated from a reference field or frame represented by a reference field signal or a reference frame signal and first and second field signal or frame signals, respectively, and wherein said coefficient determination means further operates for determining said resampling coefficients in accordance with a combination of both said first and second motion vectors.

7. The motion compensation apparatus according to claim 6, wherein said coefficient determination means comprises table lookup means for obtaining said resampling coefficients from a lookup table in accordance with values of both said first and second motion vectors.

8. The motion compensation apparatus according to claim 1, wherein said coefficient determination means comprises table lookup means for obtaining said resampling coefficients from a lookup table in accordance with values of a plurality of said other field or frame signals.

9. In a motion compensation apparatus for receiving a first imaging signal, a second imaging signal, and a reference imaging signal for outputting a motion compensated signal, including first and second motion vector estimating devices for respectively outputting first and second motion vector signals representing functions of motion estimates based on the reference imaging signal and on a respective one of said first and second imaging signals, and first and second pixel shifting means, said first pixel shifting means connected for receiving said first motion vector signal and processing the first imaging signal, and said second pixel shifting means connected for receiving said second motion vector signal and processing the second imaging signal, the improvement comprising:
coefficient determining means for determining resampling coefficients for resampling output signals of said first and second pixel shifting means,
said coefficient determining means comprising coefficient lookup table means for obtaining said resampling coefficients as a function of both said first motion vector signal and said second motion vector signal,
first and second resampler means for performing motion compensation on said first and second imaging signals, respectively,
said first and second resampler means connected for receiving said output signals of said first and second pixel shifting means, respectively, and for receiving respective resampling coefficients from said coefficient determining means as functions of both said first and second motion vector signals, and
combining means for combining outputs of said first and second resampler means to obtain said motion compensated signal.

10. A motion compensation apparatus as recited in claim 9 wherein:
said first imaging signal comprises a first field signal, said second imaging signal comprises a second field signal, and said reference imaging signal comprises a reference field signal, and
said first and second motion vector estimating devices respectively output said first and second motion vector signals representing motion estimates based on the reference field signal and on a respective one of said first and second field signals.

11. A motion compensation apparatus as recited in claim 10, wherein said first field signal comprises a precedent field signal, and said second field signal comprises a subsequent field signal, and
said first and second motion vector estimating devices respectively output said first and second motion vector signals as a precedent motion vector and a subsequent motion vector, respectively, representing motion estimates based on the reference field signal and on a respective one of said precedent and subsequent field signals.

12. A motion compensation apparatus as recited in claim 9 wherein:
said first imaging signal comprises a first frame signal, said second imaging signal comprises a second frame signal, and said reference imaging signal comprises a reference frame signal, and said first and second motion vector estimating devices respectively output said first and second motion vector signals representing motion estimates based on the reference frame signal and on a respective one of said first and second frame signals.

13. A motion compensation apparatus as recited in claim 12, wherein said first frame signal comprises a precedent frame signal, and said second frame signal comprises a subsequent frame signal, and said first and second motion vector estimating devices respectively output said first and second motion vector signals as a precedent motion vector and a subsequent motion vector, respectively representing motion estimates based on the reference frame signal and on a respective one of said precedent and subsequent frame signals.

* * * * *

UNITED STATES PATENT AND TRADEMARK OFFICE
CERTIFICATE OF CORRECTION

PATENT NO. : 5,355,168
DATED : October 11, 1994
INVENTOR(S) : Kenji SUGIYAMA

It is certified that error appears in the above-indentified patent and that said Letters Patent is hereby corrected as shown below:

On the title page, please delete item [30] and insert the following therefor:

--[30] Foreign Application Priority Data
    Oct. 31, 1991 [JP]  Japan ........ 3-313607--.

Signed and Sealed this

Seventh Day of February, 1995

Attest:

BRUCE LEHMAN

*Attesting Officer*  *Commissioner of Patents and Trademarks*